United States Patent
Reddy et al.

(10) Patent No.: US 8,408,303 B2
(45) Date of Patent: Apr. 2, 2013

(54) COMPOSITIONS FOR IMPROVING THERMAL CONDUCTIVITY OF CEMENT SYSTEMS

(75) Inventors: B. Raghava Reddy, Duncan, OK (US); Feng Liang, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 254 days.

(21) Appl. No.: 12/566,261

(22) Filed: Sep. 24, 2009

(65) Prior Publication Data

US 2011/0067864 A1 Mar. 24, 2011

(51) Int. Cl.
*E21B 33/14* (2006.01)
(52) U.S. Cl. ........................................ 166/292; 166/285
(58) Field of Classification Search .................. 166/285, 166/293, 294, 292
See application file for complete search history.

(56) References Cited

U.S. PATENT DOCUMENTS

| | | | |
|---|---|---|---|
| 5,346,012 A | 9/1994 | Heathman et al. | |
| 5,588,488 A | 12/1996 | Vijn et al. | |
| 5,913,364 A | 6/1999 | Sweatman | |
| 6,167,967 B1 | 1/2001 | Sweatman | |
| 6,220,354 B1 | 4/2001 | Chatterji et al. | |
| 6,258,757 B1 | 7/2001 | Sweatman et al. | |
| 6,308,777 B2 | 10/2001 | Chatterji et al. | |
| 6,457,524 B1 | 10/2002 | Roddy | |
| 6,500,252 B1 | 12/2002 | Chatterji et al. | |
| 6,664,215 B1 | 12/2003 | Tomlinson | |
| 6,957,702 B2 | 10/2005 | Brothers et al. | |
| 6,962,201 B2 | 11/2005 | Brothers | |
| 7,044,222 B2 | 5/2006 | Tomlinson | |
| 7,077,203 B1 | 7/2006 | Roddy et al. | |
| 7,174,961 B2 | 2/2007 | Chatterji et al. | |
| 7,174,962 B1 | 2/2007 | Roddy et al. | |
| 7,217,441 B2 | 5/2007 | Bour et al. | |
| 7,282,093 B2 * | 10/2007 | Brothers et al. | 106/644 |
| 7,351,279 B2 | 4/2008 | Brothers | |
| 7,424,914 B2 * | 9/2008 | Reddy et al. | 166/293 |
| 7,441,600 B2 | 10/2008 | Brothers et al. | |
| 7,493,968 B2 | 2/2009 | Reddy et al. | |
| 7,537,054 B2 | 5/2009 | Reddy et al. | |
| 2009/0139712 A1 * | 6/2009 | Williams et al. | 166/250.01 |

OTHER PUBLICATIONS

Matsumoto, Tadayuki, Mesophase pitch and its carbon fibers, Pure & Appl. Chemc. vol. 57, No. 11, pp. 1553,1985.*
Stormcable.com, Table B.6 Room-Temperature Linear Coefficient of Thermal Expansion (www.storcable.com/uploads/Thermal_expansion_data_table_tb06.pdf).*

(Continued)

*Primary Examiner* — Shane Bomar
*Assistant Examiner* — Silvana Runyan
(74) *Attorney, Agent, or Firm* — Craig W. Roddy; Conley Rose, P.C.

(57) ABSTRACT

A method of cementing in a subterranean formation comprises placing a cement composition comprising a non-metallic thermally conductive fiber into the subterranean formation, and allowing the composition to set therein, wherein the non-metallic thermally conductive fiber has a thermal conductivity greater than about 500 W/m·K. Another method of cementing in a subterranean formation comprises providing a cement composition comprising a pitch-based carbon fiber, a hydraulic cement material, and water, placing the cement composition in a formation, and allowing the cement composition to set therein, wherein said pitch-based carbon fiber has a density of from about 2.0 grams/cc to about 2.3 grams/cc. A cement composition comprising a cementitious material, water, and a non-metallic thermally conductive fiber having a thermal conductivity greater than about 500 W/m·K, or a pitch-based carbon fiber having a density of from about 2.0 grams/cc to about 2.3 grams/cc.

22 Claims, 3 Drawing Sheets

OTHER PUBLICATIONS

Arai, Yutaka, "Structure and properties of pitch-based carbon fibers," Oct. 1993, pp. 65-70, No. 59, Nippon Steel Technical Report.

Marques, C. et al., "Thaw front dynamics and super insulated wells for thermal recovery in cold environments," SPE 121059, 2009, pp. 1-19, Society of Petroleum Engineers.

Marsh, Harry, "A tribute to Philip L. Walker," Carbon, 1991, pp. 703-704, vol. 29, No. 6, Pergamon Press plc, Great Britain.

Patent application entitled "Compositions for improving thermal conductivity of cement systems," by B. Raghava Reddy, et al., filed Apr. 24, 2012 as U.S. Appl. No. 13/454,749.

* cited by examiner

COMPOSITIONS FOR IMPROVING THERMAL CONDUCTIVITY OF CEMENT SYSTEMS

FIELD

This disclosure relates to compositions for cement systems. More specifically, this disclosure relates to cement compositions comprising carbon fibers and their applications.

BACKGROUND

Cement crack development due to thermal stresses because of poor dissipation of heat of hydration has long been recognized as a problem in the concrete industry, especially when massive structures, such as dams are being constructed. For example, European regulations in such cases require that the temperature increase should not be any higher than 36° F. (20° C.). Japan and Korea specify a temperature increase restriction for civil engineering projects by defining a Crack Index ($I_{Cr}$) in terms of $\Delta T$ (cross-section temperature difference in ° C.) as $I_{Cr}=15/\Delta T$ for internally restrained concretes. The greater $\Delta T$, the smaller the $I_{Cr}$ value, and the greater the probability of crack development. This is illustrated in FIG. 1.

During oil well cementing, the increase in slurry temperature due to heat of hydration can result in a temperature difference between the hydrating cement slurry and the wellbore fluids. This temperature difference between the hydrating cement slurry and the formation can easily exceed 15° C., resulting in $I_{Cr}<1$ and probability of crack occurrence>50%.

In the case of set cement, during the life of the well, the set cement is exposed to cooler temperatures on the wellbore side when cooler surface fluids are pumped into the wellbore, and hotter temperatures at the periphery due to high static formation temperatures. The temperature difference between the inner diameter (ID) and outer diameter (OD) of the cement sheath may reach on the order of several degrees. In the event that the cement is unable to respond to the temperature differences by expansion and contraction at an appropriate rate, or to quickly reach equilibrium temperatures by conducting heat due to its low thermal conductivity, cracks will develop in the body of the cement sheath. This also may result in casing contraction leading to debonding of cement from the casing and the formation of microannuli if the temperature is not equalized quickly.

Without wishing to be limited by theory, crack development during setting of cement due to heat of hydration may be explained as follows. When the temperature rise due to hydration is higher than the placement temperature, the cement paste will be in a compressed form due to volume expansion while being constrained by the wellbore wall and casing. During this phase, the hydrating cement paste has not gained sufficient strength to resist volume expansion and can relax by plastic deformation. When the exotherm of hydration is fully released, the temperature begins to decrease to the placement temperature. During this temperature drop, the built in stresses on the composition will transition from compressive stresses to tensile stresses. If the cement composition cannot accommodate the tensile stresses by optimal volume changes while being restrained, cracks will develop in the cement column. In another scenario, if the cement shrinks by debonding from the casing or formation to accommodate the tensile stresses, then a microannulus will form as a result. Consequently, there is a continuing need and interest to develop cement compositions with improved thermal conductivities

SUMMARY

Disclosed herein is a method of servicing a wellbore comprising placing a composition comprising cementitious material and a non-metallic thermally conductive fiber into a subterranean formation, and allowing the composition to set therein, wherein the non-metallic thermally conductive fiber has a thermal conductivity greater than about 500 W/m·K.

Also disclosed herein is a method of cementing in a subterranean formation comprising providing a cement composition comprising pitch-based carbon fiber, a hydraulic cement material, and water, placing the cement composition in the subterranean formation, and allowing the cement composition to set therein, wherein said pitch-based carbon fiber has a density of from about 2.0 grams/cc to about 2.3 grams/cc.

Further disclosed herein is a cement composition comprising a cementitious material, water, and a non-metallic thermally conductive fiber having a thermal conductivity greater than about 500 W/m·K, or a pitch-based carbon fiber having a density of from about 2.0 grams/cc to about 2.3 grams/cc.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Reference will now be made to the accompanying drawings in which.

NOTATION AND NOMENCLATURE

Figure 1:
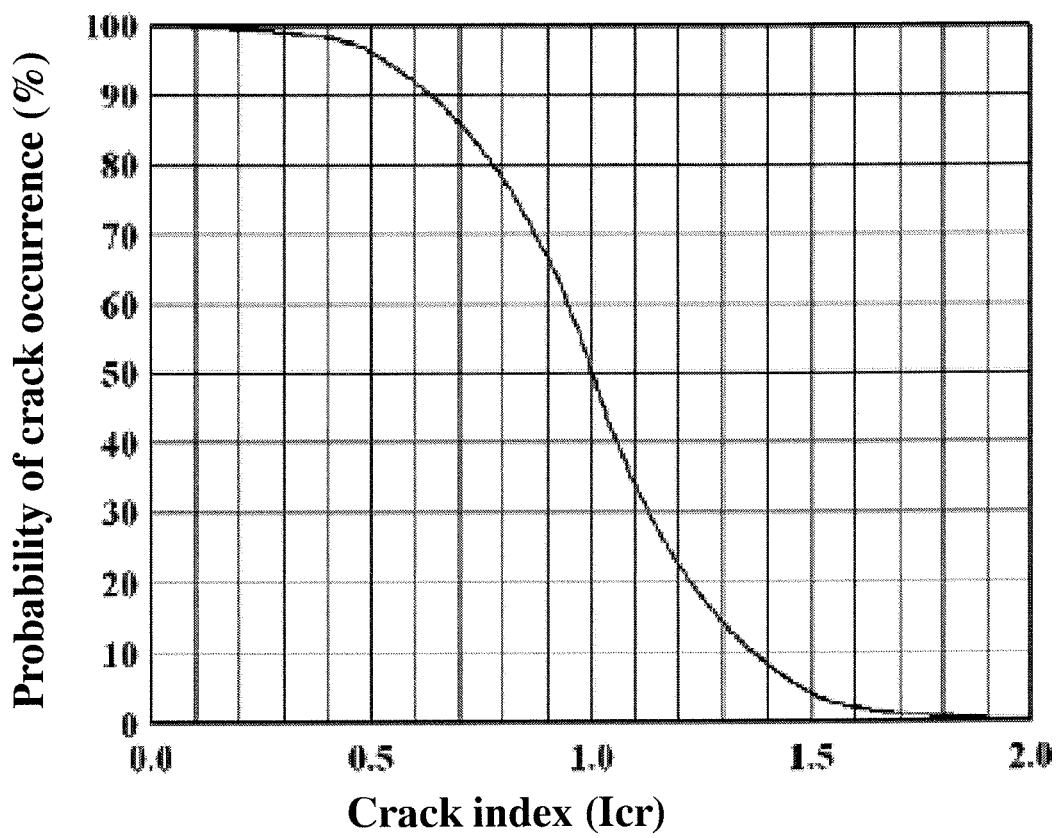
FIG. 1 illustrates the relationship between probability of crack occurrence and crack index ($I_{Cr}$).

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . "

DETAILED DESCRIPTION

Disclosed herein are wellbore servicing compositions and methods of making and using same. In an embodiment, the wellbore servicing composition comprises a cementitious material and a non-metallic thermally conductive fiber (NMTCF). The wellbore servicing composition comprising the NMTCF and cementitious material is hereinafter termed a thermally improved cement composition (TICC). Methods of making and using TICCs are described in greater detail herein.

In an embodiment the TICC comprises a NMTCF. Any NMTCF compatible with the other components of the wellbore servicing composition may be suitable for use in this disclosure. In an embodiment, the NMTCF comprises a carbon fiber. Carbon fiber suitable for the present disclosure may also be referred to as graphite fiber, graphitized carbon fiber or carbon graphite fiber. Carbon fiber generally refers to a material that is comprised primarily of carbon consisting of extremely thin fibers greater than about 70 nm in diameter, alternately in the range of about 100 nm to about 20 microns, alternately in the range of about 500 nm to about 15 microns, and alternately in the range of 1 to 12 microns. For example, the carbon fiber may be an oriented graphite fiber. Herein an oriented graphite fiber refers to orientation of constituent planar graphite molecules in the direction of fiber axis, and the oriented macrostructures can be detected by a polarized light microscope. As a result of the anisotropic orientation of molecules along the longitudinal direction, the materials' properties along the longitudinal axis are substantially different from those measured along the transverse direction. As an example, the thermal conductivity along the longitudinal direction may be greater than about five hundred times that measured along the transverse direction. A discussion of the fiber-making process, thermal graphitization process, and comparison of fiber properties is presented in Nippon Steel Technical Report No. 59, dated October 1993 and titled "Structure and Properties of Pitch Based Carbon Fibers" by Yutaka Arai, and incorporated by reference herein.

Carbon fibers suitable for use in this disclosure may contain different levels of graphite as determined by measuring the crystallinity of the fiber by techniques such X-ray crystallography and measuring parameters such as interlayer spacing and crystal stacking thickness. When the graphitization reaches maximum values, fiber material properties such as electrical resistivity reaches a minimum plateau value, or electrical conductivity reaches maximum plateau value. The anisotropy of fibers properties, for example differences in properties measured along fiber axis and along the transverse direction, also increase and reach stable values. A schematic of structure changes during the thermal treatment of carbon fibers is presented in reference, Carbon. 29 (6), 703 (1991).

In an embodiment, the NMTCF comprises carbon fibers which are derived from petroleum based pitch, also referred to refinery pitch, alternatively the carbon fiber is derived from mesophase pitch. Pitch is the name for any of a number of highly viscous liquids which behave as solid with a broad softening temperature range instead of a defined melting temperature and may be derived from materials such as petroleum as a residue from heat treatment and distillation of petroleum fractions. Mesophase is a liquid crystal form of condensed aromatic compounds. Mesophase pitch refers to a pitch with a complex mixture of numerous essentially aromatic hydrocarbons containing anisotropic liquid-crystalline particles detectable by optical microscopy and capable of coalescence into the bulk mesophase. Carbon fibers derived from mesophase pitch display a graphitic structure after heat treatment at temperatures exceeding 2200° C. A graphitic structure refers to one wherein the carbon atoms are arranged in a hexagonal pattern that form sheets which are stacked parallel to one another in regular fashion.

In an embodiment, the NMTCF is produced by chemical vapor deposition (CVD) method. In CVD, a flowing mixture of hydrocarbon and hydrogen gases is exposed to metal particles. Dehydrogenation/carbon deposition/fiber growth from the metal particle surfaces forms cylindrical nanotubes. The diameters of such tubular fibers are in the range from about 70 to about 200 nanometers, and lengths are in the range from about 50 microns to about 200 microns. Commercial examples of such fibers include heat treated PYROGRAPH I from Applied Sciences Inc., Cedarville, Ohio.

In an embodiment, the NMTCF has an ultrahigh thermal conductivity. Herein an ultrahigh thermal conductivity refers to a thermal conductivity greater than about 500 watt per meter Kelvin (W/m·K). In an embodiment the NMTCF has a thermal conductivity of at least about 500, 800, 1000, 1200, 1500, 2000, 2500, 3000, 3500, 4000, 4500, 5000, 5500, 6000, or 6500 W/m·K. In an embodiment the NMTCF has a thermal conductivity of greater than about 800, 1000, 1200, 1500, 2000, 2500, 3000, 3500, 4000, 4500, 5000, 5500, 6000, or 6500 W/m·K. The relative thermal conductivities for various materials are given in Table 1.

TABLE 1

| Material | Type or shape | Maximum nominal thermal conductivity W/m · K |
| --- | --- | --- |
| Copper | Metal | 400 |
| Aluminum | Metal | 150 |
| [1]PAN based carbon fiber | Continuous fiber | 160 |
| Pitch based carbon fiber | Continuous fiber | 1100 |
| Pitch based carbon fiber | Discontinuous fiber | 800 |
| CVD carbon fiber | Discontinuous fiber | 1900 |
| Diamond | Particle | 2000 |
| Synthetic graphite | Flake | 600 |
| Graphite nano-platelet | Flake | 2000 |
| Single wall carbon nanotube | Nanotube | 2000-6600 |

[1]PAN = polyacrylonitrile

For all carbon fibers, irrespective of the method of production of the fiber or fiber precursor, increased graphite content from the thermal treatment at temperatures from about 2600° C. to about 3000° C., results in an increase in density due to more efficient packing of planar graphite sheet in the fiber structure. Thus, all carbon fibers with thermal conductivity values in the range of interest for this disclosure have densities in the range of from about 2.0 grams/cc to about 2.3 grams per cc., alternatively of from about 2.1 to about 2.3 grams/cc. In an embodiment, thermally conductive carbon fibers are further characterized by Coefficient of Thermal Expansion (CTE) values equal to less than (higher negative values) than about −1.0 ppm/° C.

In an embodiment the NMTCF is characterized by a length of from about 20 microns to about 25 mm, alternatively from about 75 microns to about 15 mm, and alternatively about 100 microns to about 12 mm. A NMTCF suitable for use in this disclosure may be further characterized by a cross sectional diameter of from about 70 nm to about 20 microns, alternatively from about 500 nm to about 15 microns, and alternatively about 1 to about 12 microns; and an aspect ratio of from about 5 to about 400000, alternatively from about 200 to about 20000, and alternatively about 500 to about 10000. Herein the aspect ratio of fibers is defined as the ratio of the length of a fiber to its cross sectional diameter.

A NMTCF suitable for use in this disclosure may be further characterized by a longitudinal compressive strength of from about 20000 psi to about 100000 psi, alternatively from about 30000 psi to about 70000 psi, and alternatively about 40000 psi to about 60000 psi; a tensile strength of from about 0.2E+6 psi to about 3E+6 psi, alternatively from about 0.3E+6 psi to about 2E+6 psi, alternatively about 0.4E+6 psi to about 1.0E+6 psi; and a tensile moduli greater than about 100,000 psi; alternatively from about 150,000 psi to about 100E+6 psi; and alternatively from about 500000 psi to about 75E+6 psi. Tensile strength is defined herein as the maximum longitudinal stress a material can withstand before tearing. Herein the tensile modulus refers to the ratio of stress to elastic strain in tension.

In an embodiment, the ratio of longitudinal to transverse modulus for pitch based fibers suitable for use in this disclosure is in the range of from about 110:1 to about 135:1.0.

In an embodiment, the NMTCF is a continuous fiber. In an embodiment, the NMTCF is a discontinuous fiber. In another embodiment, the NMTCF comprises chopped fibers which are obtained by cutting the continuous fiber to desired lengths. Chopped fiber lengths suitable for the current disclosure range from about 2 mm to about 25 mm, alternatively from about 3 mm to about 15 mm, and alternatively from about 6 mm to about 12 mm. Herein a continuous fiber refers to a polycrystalline or amorphous body which has its ends outside the stress fields under consideration while a discontinuous fiber has its ends inside the stress fields under consideration. Discontinuous fibers may be obtained by a milling process or by milling chopped fibers. Examples of commercially available mesophase pitch based graphitized discontinuous carbon fibers suitable for use in present disclosure includes THERMALGRAPH DKD X and THERMALGRAPH DKA X available from Cytec Industries, Woodland Park, N.J., and GRANOC Grade XN-100 milled fibers from Nippon Graphite Fiber Corporation, Tokyo, Japan. Examples of suitable pitch based carbon continuous fibers that can be chopped to desired lengths include P-100S 2k, P120S 2k, and K1100 2k from Cytec Industries, Woodland Park, N.J., and GRANOC Grade XN-100 and CNG-90 chopped fibers of Nippon Graphite Fiber Corporation, Tokyo, Japan. In an embodiment, the TMCF comprises a combination of carbon fibers of two or more lengths having desired thermal conductivity values. In an embodiment, the fiber length distribution is bimodal or trimodal. In an embodiment, combination of one set of short fibers with lengths less than about 500 microns, and a second set of long fibers with lengths equal to greater than about 1 mm are used thus providing a bimodal length distribution. The ratio of short to long fibers may be in the range of from about 1:10 to about 10:1.

The NMTCF may be present in the TICC in an amount of from about 1 wt. % to about 30 wt. % by total weight of the composition, alternatively from about 5 wt. % to about 20 wt. %, and alternatively from about 10 wt. % to about 15 wt. %. Hereinafter the disclosure will focus on the use of a NMTCF comprising a carbon fiber although other NMTCFs as known to one of ordinary skill in the art with the benefits of this disclosure are also contemplated.

In an embodiment, the TICC comprises a cementitious material. In an embodiment, any cementitious material suitable for use in subterranean well cementing operations may be included in the compositions of this disclosure. The cementitious material may be a hydraulic cement comprising calcium, aluminum, silicon, oxygen, and/or sulfur. Nonlimiting examples of cementitious materials suitable for use in this disclosure include Portland cements (e.g., classes A, C, G, and H Portland cements), construction cements (e.g., type I and II), pozzolanic cements, gypsum cements, shale cements, acid/base cements, phosphate cements, high alumina content cements, silica cements, high alkalinity cements, magnesia cements, fly ash cement, zeolite cement systems, cement kiln dust cement systems, slag cements, micro-fine cement, metakaolin, Sorel cement which typically comprises magnesium oxide and a chloride or phosphate salt which together form for example magnesium oxychloride, or combinations thereof. In an embodiment, the cementitious material is selected from the group consisting of Portland cement, construction cement, pozzolanic cement, gypsum cement, shale cement, acid/base cement, phosphate cement, high alumina content cement, silica cement, high alkalinity cement, magnesia cement, fly ash cement, a zeolite cement system, a cement kiln dust cement system, slag cement, micro-fine cement, metakaolin, Sorel cement, and a combination thereof.

Other examples of cements are disclosed in U.S. Pat. Nos. 6,457,524; 7,077,203; and 7,174,962, each of which is incorporated herein by reference in its entirety. Examples of magnesium oxychloride cements are disclosed in U.S. Pat. Nos. 6,664,215 and 7,044,222, each of which is incorporated herein by reference in its entirety.

The cementitious material may be present in the TICC in an amount of from about 20 wt. % to about 80 wt. % by weight of the TICC, alternatively from about 30 wt. % about 70 wt. %, and alternatively from about 40 wt. % to about 60 wt. %.

In an embodiment, water is present in the TICC in an amount sufficient to form a pumpable slurry. The water utilized in the cement compositions of this disclosure may include fresh water, salt water (e.g., water containing one or more salts dissolved therein), or seawater. Generally, the water may be from any source provided that it does not contain an excess of compounds that adversely affect other components in the cement composition. In an embodiment, water is present in the TICC in an amount in the range of from about 20 wt. % to about 180 wt. % by weight of the cementitious material, alternatively from about 28 wt. % to about 100 wt. %, and alternatively from about 35 wt. % to about 50 wt. %.

In some embodiments, additives may be included in the wellbore servicing composition for improving or changing the properties thereof. Examples of such additives include but are not limited to, defoamers, foaming surfactants, fluid loss agents, weighting materials, latex emulsions, dispersants, vitrified shale and other fillers such as silica flour, sand and slag, formation conditioning agents, hollow glass or ceramic beads or combinations thereof. Other mechanical property modifying additives, for example, elastomers and the like can be added to further modify the mechanical properties. These additives may be included singularly or in combination. Methods for introducing these additives and their effective amounts are known to one of ordinary skill in the art.

In an embodiment, the TICC comprises a cementitious material, water, and a NMTCF having a thermal conductivity greater than about 500 W/m·K, or a pitch-based carbon fiber having a density of from about 2.0 grams/cc to about 2.3 grams/cc. Each of these components of the TICC has been described previously herein.

In an embodiment, the TICC has a thermal conductivity in the range of from about 0.75 W/m·K to about 15 W/m·K, alternatively from about 1 W/m·K to about 10 W/m·K, and alternatively from about 2 W/m·K to about 7.5 W/m·K as determined in accordance with ASTM E1530.

The TICCs disclosed herein can be used for any purpose. In an embodiment, the TICCs disclosed herein are used as wellbore servicing compositions to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the TICC in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; and to seal an annulus between the wellbore and an expandable pipe or pipe string. For instance, the TICC may set in a loss-circulation zone and thereby restore circulation. The set composition plugs the zone and inhibits loss of subsequently pumped drilling fluid, which allows for further drilling. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the TICC may be employed in well completion operations such as primary and secondary cementing operations. Said compositions may be placed into an annulus of the wellbore and allowed to set such that it isolates the subterranean formation from a different portion of the wellbore. The TICC thus form a barrier that prevents fluids in that subterranean formation from migrating into other subterranean formations. Within the annulus, the fluid also serves to support a conduit, e.g., casing, in the wellbore.

In an embodiment, the wellbore in which the TICC is positioned belongs to a multilateral wellbore configuration. It is to be understood that a multilateral wellbore configuration includes at least two principal wellbores connected by one or more ancillary wellbores. In secondary cementing, often referred to as squeeze cementing, the TICC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a wellbore servicing composition in a wellbore are described in U.S. Pat. Nos. 5,346,012 and 5,588,488, which are incorporated by reference herein in their entirety.

The use of TICCs of the type described herein in wellbore servicing may provide numerous advantages, such as (1) the capability of rapid dissipation of heat of hydration during cement setting process; (2) the capability of rapid temperature equilibration in the cement; (3) and the capability of reducing the elongation of the casing when thermal stress is exerted on the steel by hot fluids in the wellbore. Rapid dissipation of the heat of hydration is expected to prevent crack development due to the build-up of thermal stresses (compressive and tensile) from inhomogeneous heat distribution in the center of slurry column vs. the slurry adjacent to the casing and formation. A further advantage associated with the use of a TICC of the type described herein is a rapid temperature equilibration in the cement when the set cement column is exposed to temperature differentials between wellbore fluids and formation temperatures.

In an embodiment the wellbore servicing compositions disclosed herein (i.e., TICCs) display improved thermal conductivity and function to reduce crack development probability by allowing the cement, either during the setting phase or after it is set, to reach thermal equilibrium rapidly with its environment. Additionally, cement compositions with improved thermal conductivities are expected to be more suitable for set-on-demand applications, which use heat as the trigger to set the cement.

In some embodiments, the cement compositions of this disclosure (i.e., TICCs) contribute to the long-term structural integrity of cement structures experiencing challenges such as thermal cycles. Further, TICCs may form set cement composition having a reduced amount of compressive and tensile stresses when compared to set cement compositions lacking a NMTCF. In embodiments, the cement compositions of this disclosure are useful for building civil structures (such as dams, bridges, canals), wherein rapid heat dissipation and/or rapid temperature equilibration within structures is desired.

This disclosure does not contemplate the use of an NMTCF comprising carbon nano-tube fibers, whether single walled carbon nano-tubes (SWNT) which have typical diameters in the range of 1-2 nm, or multiwalled carbon nano-tubes (MWNT) which have typical diameters in the range of 5-50 nm. Nor does this disclosure contemplate the use of an NMTCF produced from organic polymers, for example polyacrylonitrile (PAN). In an embodiment a TICC of the type described herein excludes carbon nanotube fibers. In an alternative embodiment, a TICC of the typed described herein excludes an NMTCF produced from organic polymers.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Figure 2A:
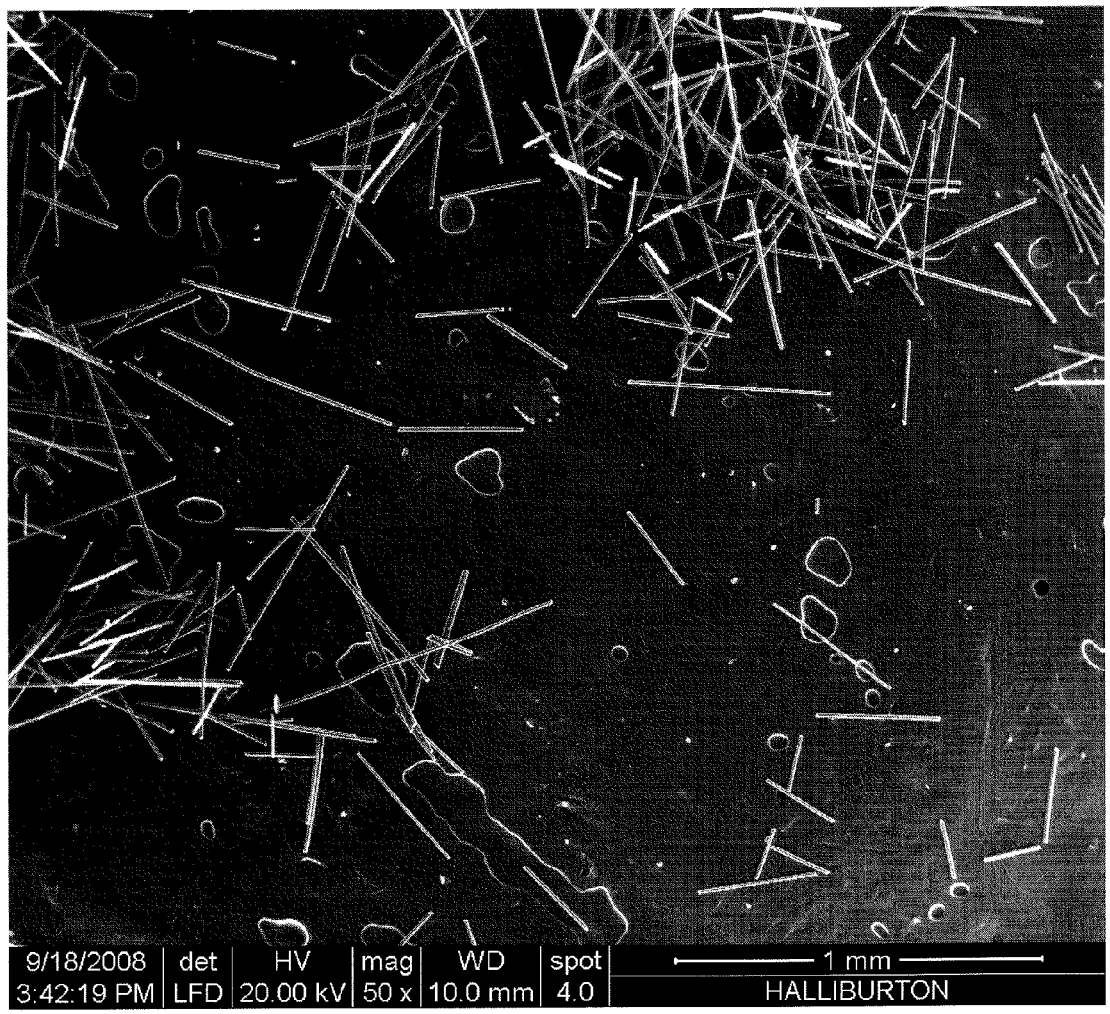
FIG. 2A is a scanning electron micrograph of petroleum pitch-based, graphitized carbon fibers in chopped form.
Figure 2B:
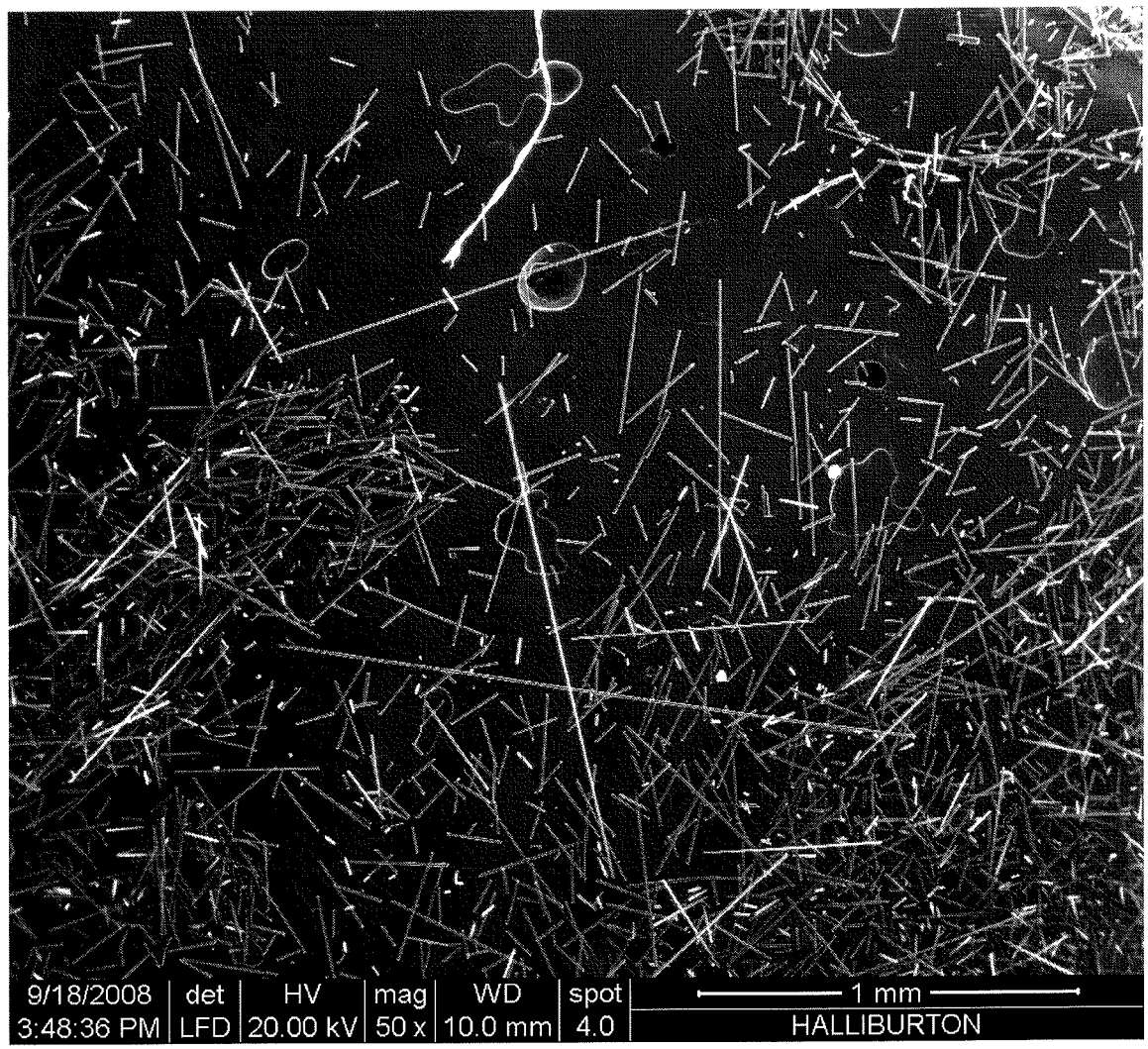
FIG. 2B is a scanning electron micrograph of polyacrylonitrile (PAN)-based carbon fibers.

The thermal properties of cement compositions of the type described herein were investigated. Cement samples having a slurry density of 16.4 pounds per gallon (ppg) were prepared that contained Class H cement and tap water (water to cement ratio 0.394:10) and either pitch based THERMALGRAPH DKD X or PAN based AGM-94 carbon fibers in the amounts indicated in Table 2 by addition of a dry blend of fibers and cement to water according to ANSI/API Recommended Practice 10B-2 (Formerly 10B) First Edition, July 2005. THERMALGRAPH DKD X is a petroleum pitch based fiber in chopped form available from Cytec Industries. AGM-94 carbon fibers are PAN derived (PAN based) carbon fibers available from Asbury Graphite Mills, Inc., Asbury, N.J. FIG. 2A is a scanning electron micrograph (SEM) of THERMALGRAPH DXD X fibers; and FIG. 2B is an SEM of AGM-94 fibers.

The density of AGM-94 fibers was 1.73 to 1.79 grams/cc, whereas that of THEMALGRAPH DKD X was 2.15-2.25 g/cc. The reported tensile modulus values for AGM-94 fibers were 180-240 GPa (261 Msi-348 Msi); tensile strength, 2000-3600 Mpa (290 ksi-522 ksi); and the average fiber length was 150 microns.

THERMALGRAPH DKD X fiber has a thermal conductivity 50% greater than copper and is estimated by the supplier to be 400-700 W/m·K, a tensile modulus in the range 100-135 Msi, and tensile strength greater than 200 ksi. The average fiber length was 200 microns.

The thermal conductivities of set cement samples were measured using a UNITHERM Model 2022 Thermal Conductivity Instrument purchased from ANTER Corporation, Pittsburgh, Pa. Compressive strengths of these cement compositions were measured according to the ANSI/API recommended practiced previously referenced, and Brazilian tensile strengths were measured according to a method analogous to ASTM C496. The results are listed in Table 2. A cement slurry of similar density comprising no carbon fibers was also tested as the control sample, and designated Sample 1.

TABLE 2

| Sample No. | Carbon fiber % bwoc | Thermal conductivity W/m · K | Compressive strength (crush) psi | Brazilian tensile strength psi |
|---|---|---|---|---|
| 1 | None (control) | 0.660 | 5220 | 560 |
| 2 | 1% DKD X | 0.847 | 4470 | 490 |
| 3 | 5% DKD X | 2.586 | 5620 | 610 |
| 4 | 1% AGM-94 | 0.632 | 5820 | 570 |
| 5 | 5% AGM-94 | 0.742 | 6420 | 650 | bwoc = by weight of cement composition

The results in Table 2 demonstrate that carbon fibers derived from PAN did not improve the thermal conductivity of cement compositions in which they were included (Samples 4 and 5) when compared to that of the control sample, Sample 1. In contrast, including the petroleum pitch based graphite carbon fibers in the cement compositions (i.e., Samples 2 and 3) increased the thermal conductivity of the compositions. For example the thermal conductivity of the cement composition increased by approximately 400% when the petroleum pitch based graphite carbon fibers were included at a level of 5% by weight of cement, Sample 3. The results also indicate that the mechanical properties of cement compositions comprising pitch based graphite carbon fibers, for example compressive and tensile strengths, were not significantly affected.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of cementing in a subterranean formation comprising:
providing a cement composition comprising a combination of pitch-based carbon fibers, a hydraulic cement material, and water;
placing the cement composition in the subterranean formation or in a wellbore penetrating the subterranean formation; and
allowing the cement composition to set therein;
wherein the combination of pitch-based carbon fibers has a density of from about 2.0 grams/cc to about 2.3 grams/cc and wherein the fiber length distribution of the combination of pitch-based carbon fibers is bimodal.

2. The method of claim 1 wherein the bimodal fiber length distribution has a ratio of short to long fibers in the range of from about 1:10 to about 10:1.

3. The method of claim 1 wherein the ratio of longitudinal to transverse modulus for the pitch-based carbon fibers is in the range of from about 110:1 to about 135:1.0.

4. The method of claim 1 wherein the combination of pitch-based carbon fibers comprises a first set of fibers having lengths of less than about 50 microns and a second set of fibers having lengths of greater than about 1 mm.

5. The method of claim 1 wherein the pitch-based carbon fibers have aspect ratios of from about 200 to about 400000.

6. The method of claim 1 wherein the pitch-based carbon fibers are oriented.

7. The method of claim 1 wherein the pitch-based carbon fibers are continuous or discontinuous.

8. The method of claim 1 wherein the pitch-based carbon fibers are derived from mesophase pitch.

9. The method of claim 1 wherein the composition further comprises fiber produced by chemical vapor deposition.

10. The method of claim 1 wherein the pitch-based carbon fibers have lengths of from about 20 microns to about 25 mm.

11. The method of claim 1 wherein the pitch-based carbon fibers have cross-sectional diameters of from about 70 nm to about 20 microns.

12. The method of claim 1 wherein the pitch-based carbon fibers have longitudinal compressive strength of from about 20000 psi to about 100000 psi.

13. The method of claim 1 wherein the pitch-based carbon fibers have a tensile strength of from about 0.2E+6 psi to about 3E+6 psi.

14. The method of claim 1 wherein the pitch-based carbon fibers have a coefficient of thermal expansion of less than about 1 ppm/° C.

15. The method of claim 1 wherein the pitch-based carbon fibers are present in the composition in an amount of from about 1 wt. % to about 30 wt. %.

16. The method of claim 1 wherein the cement composition comprises a cementitious material selected from the group consisting of: Portland cement, construction cement, pozzolanic cement, gypsum cement, shale cement, acid/base cement, phosphate cement, high alumina content cement, silica cement, high alkalinity cement, magnesia cement, fly ash cement, a zeolite cement system, a cement kiln dust cement system, slag cement, micro-fine cement, metakaolin, Sorel cement, and a combination thereof.

17. The method of claim 1 wherein the cementitious material is present in an amount of from about 20 wt. % to about 80 wt. %.

18. The method of claim 1 wherein the cement composition comprises water which is present in an amount of from about 20 wt. % to about 180 wt. %.

19. The method of claim 1 wherein the composition has a thermal conductivity of from about 0.75 W/m K to about 15 W/m K.

20. The method of claim 1 wherein the pitch-based carbon fibers have thermal conductivities of greater than about 500 W/m·K.

21. The method of claim 20 wherein the pitch-based carbon fibers have thermal conductivities of greater than about 800 W/m·K.

22. The method of claim 21 wherein the pitch-based carbon fibers have thermal conductivities of greater than about 1100 W/m·K.

* * * * *